United States Patent [19]

Han

[11] Patent Number: 5,227,092
[45] Date of Patent: Jul. 13, 1993

[54] PROCESS FOR FORMING CONJUGATED BACKBONE BLOCK COPOLYMERS

[75] Inventor: Chien-Chung Han, Madison, N.J.

[73] Assignee: Allied-Signal Inc., Morristown, N.J.

[21] Appl. No.: 727,747

[22] Filed: Jul. 10, 1991

[51] Int. Cl.$^5$ .......................... H01B 1/00; H01B 1/06
[52] U.S. Cl. ..................... 252/500; 252/518;
524/157; 524/158; 525/540; 328/422; 328/480;
328/502; 328/503
[58] Field of Search ................ 252/500, 518; 528/422,
528/480, 502, 503; 524/157, 158; 525/540

[56] References Cited

U.S. PATENT DOCUMENTS

| | | | |
|---|---|---|---|
| 3,963,498 | 6/1976 | Trevoy | 252/500 |
| 4,025,463 | 5/1977 | Trevoy | 252/500 |
| 4,582,872 | 4/1986 | Hudgin et al. | 524/439 |
| 4,615,829 | 10/1986 | Tamura et al. | 252/500 |
| 4,798,685 | 1/1989 | Yaniger | 252/500 |
| 4,806,271 | 2/1989 | Yaniger et al. | 252/500 |
| 4,822,638 | 4/1989 | Yaniger | 252/500 |
| 4,851,487 | 7/1989 | Yaniger et al. | 252/500 |
| 4,855,361 | 8/1989 | Yaniger et al. | 252/500 |

FOREIGN PATENT DOCUMENTS

| | | |
|---|---|---|
| 0035713 | 2/1981 | European Pat. Off. |
| 0152632 | 12/1984 | European Pat. Off. |
| 0259813 | 9/1987 | European Pat. Off. |
| 3440617 | 11/1984 | Fed. Rep. of Germany |
| 62-12073 | 1/1987 | Japan |
| 62-47109 | 2/1987 | Japan |
| WO8901694 | 2/1989 | PCT Int'l Appl. |
| WO9010297 | 7/1990 | PCT Int'l Appl. |

OTHER PUBLICATIONS

Berlovis and Schiffrin, "Recent Advances In Electrochemical Polymerization For Surface Coating" Wolson Center for Electrochemical Science, University of Southampton, 64, pp. 42-46 (1986).
B. Wessling et al., "Post Polymerisation Processing of Conductive Polymers (CP)", Synthetic Metals, vol. 18, pp. 671-676. (1987).
K. Miyasaka et al., "Electrical Conductivity of carbon-polymer Composites as a Function of Carbon Content", Journal of Materials Science, vol. 17, pp. 1610-1616, (1982).
B. Wessling et al., "Post-Polymerization Processing of Conductive Polymers: A Way of Converting Conductive Polymers to Conductive Materials", Synthetic Metals, vol. 15, pp. 183-193, (1986).
B. Wessling et al., "Thermoplastic Conversion of 'Doped' Polyaniline from the Amorphous to a Partially Crystalline State", Synthetic Metals, vol. 16, pp. 127-131, (1986).
T. Masatake et al; "Secondary batteries with polyaniline cathods", Aug. 8, 1983; Chemical Abstracts, vol. 109, No. 6, & Jpn. Kokai Tokkyo ho JP 63 55,861(88 55,861) Mar. 10, 1988.
Chan et al., Thermal Analysis of Conducting Polymers Part I, Journal of Thermo-Analysis, 35, 765-774 (1989).
S. Li et al. "Soluble Polyaniline" Synthetic Metals, 20 (1987) 141-149.
K. Hyodo et al. "Short Communication . . . High Ion Selective Electr chemical . . . " Electro Acia vol. 33, No. 1, pp. 165-166, 1983.
L. T. Yu et al. "Conductivite et Constitution Chimique pe Semi-Conducteurs Macromoleculaires" Revue Generale de L'Elec . . . vol. 75, No. 9, pp. 104-1019.
M. Jozefowicz et al. "Relations entre Proprietes Chimiques et . . . " Revue Generale de L'Electricite vol. 75, No. 9, pp. 1008-1013.
D. Muller et al. "Preparation, Proprietes Chimiques et Conduct . . . " pp. 4087-4091.
L. T. Yu et al. "Etude experimentale de la Conductive en Couran Continu des Composes Macromoleculaires" Jrnl Polymer Sc. PT. C No. 16/pp. 2931-2942.
M. Jozefowicz et al. "Properties Nouvelles des Polymeres Semi . . . " J. Poly. Sci. Part C/No. 22, pp. 1187-1195 (1969).
T. Kobayashi et al. "Electrochemical Reactions Concerned With Electrochromism . . . " J. Electroanal Chem. 177/(1984) pp. 281-291.
T. Kobayashi et al. "Oxidative Degradation Pathway of Polyaniline Film Electrodes" J. Electroanal Chem. 177(1984) pp. 293-297.
F. Cristofini et al. "Properties Electochimiques des Sulfates de Polyaniline" C. R. Acad. Sc. Paris, t. 268 (Apr. 14, 1969) pp. 1346-1349.
D. Labarre et al. "Polymeres Conducteurs Organiques Filmogenes a base de Polyaniline" C. R. Acad. Sc. Paris, t. 269 (Oct. 24, 1969) pp. 964-969 Series C.
M. Doriomedoff et al. "Conductivite en Courant Continu Des Sulfates De Polyanilines" (#142) pp. 1055-1069.
L-T Yu et al. "Conductivite en Courant Continu des Materiaux Macromoleculaires" pp. 470-532 (Chapter 11).
R. de Surville et al. "Produits Oligomeres et Polymeres D'Oxydation des Amines Aromatiques" Ann. Chim. t2, 1967, pp. 5-13.
R. de Surville, "Electrochemical Chains Using Protolytic Organic Semiconductors" Elec. Acta 1958 vol. 13, pp. 1451-1458.
R. de Surville, "Produits D'Oxidation Pousée des Amines Aromariguis" Ann. Chim. t2, 1967, pp. 149-157.

Primary Examiner—Mark L. Bell
Assistant Examiner—Anthony J. Green
Attorney, Agent, or Firm—R. C. Stewart, II; G. H. Fuchs; D. L. Webster

[57] ABSTRACT

This invention relates to a process for forming polyaniline block copolymers, to block copolymers formed by said process and to articles formed from said copolymers.

33 Claims, No Drawings

PROCESS FOR FORMING CONJUGATED BACKBONE BLOCK COPOLYMERS

BACKGROUND OF THE INVENTION

1. Field of the Invention

This invention relates to a process for preparing electrically conductive and non-conductive block conjugated backbone copolymers. A more preferred aspect of this invention relates to such a process for preparing said electrically conductive and non-conductive block copolymers by the polymerization of aromatic amines. Another aspect of this invention relates to said conductive and non-conductive conjugated backbone block copolymers formed by the process of this invention and to articles formed from such conductive and non-conductive block copolymers, such as coatings, films, parts and fibers.

2. Prior Art

There has recently been an increased interest in the electrochemistry and electrical phenomena of polymeric systems. Recently, work has intensified with backbone polymers having extended conjugation in at least one backbone chain.

One conjugated polymer system currently under study is polyaniline. Kobayashi, et al., *J. Electroanal. Chem.*, "Electrochemical Reactions Concerned with Electrochromism of Polyaniline Film-Coated Electrodes", 177 281-291 (1984), describes various experiments in which spectro electro-chemical measurement of a polyaniline film coated electrode were made. French Patent No. 1,519,729; French Patent of Addition 94,536; U.K. Patent 1,216,549; "Direct Current Conductivity of Polyaniline Sulfate", M. Diriomedoff, F. Kautiere—Cristofini, R. De Survill, M. Jozefowicz, L-T. Yu, and R. Buvet, *J. Chim. Phys. Physicochim. Biol,* 68, 1055 (1971); "Continuous Current Conductivity of Macromolecular Materials", L-T. Yu, M. Jozefowicz, and R. Buvet, *Chim. Macrol,* 1, 469 (1970); "Polyaniline Based Filmogenic Organic-Conductor Polymers", D. LaBarre and M. Jozefowicz, *C.R. Acad. Sci., Ser. C,* 269, 964 (1969); "Recently discovered Properties of Semiconducting Polymers", M. Jozefowicz, L-T. Yu, J. Perichon, and R. Buvet, *J. Polym. Sci.,* Part C, 22, 1187 (1969); "Electrochemical Properties of Polyaniline Sulfates", F. Cristofini, R. De Surville, and M. Jozefowicz, *C.R. Acad. Sci., Ser. C,* 268, 1346 (1979); "Electrochemical Cells Using Protolytic Organic Semiconductors", R. De Surville, M. Jozefowicz, L-T. Yu, J. Perichon, R. Buvet, *Electrochem. Acta.,* 13, 1451 (1968); "Oligomers and Polymers Produced by Oxidation of Aromatic Amines", R. De Surville, M. Jozefowicz, and R. Buvet, *Ann. Chem.* (Paris) 2 5 (1967); "Experimental Study of the Direct Current Conductivity of Macromolecular Compounds", L-T. Yu, M. Borredon, M. Jozefowicz, G. Belorgey, and R. Buvet, *J. Polym. Sci. Polym. Symp.,* 16, 2931 (1967); "Conductivity and Chemical Properties of Oligomeric Polyaniline", M. Jozefowicz, L-T. Yu, G. Belorgey, and R. Buvet, *J. Polym. Sci. Polym. Symp.,* 16, 2943 (1967); "Products of the Catalytic Oxidation of Aromatic Amines", R. De Surville, M. Jozefowicz, and R. Buvet, *Ann. Chim.* (Paris), 2, 149 (1967); "Conductivity and Chemical Composition of Macromolecular Semiconductors", *Rev. Gen. Electr.,* 75 1014 (1966); "Relation Between the Chemical and Electrochemical Properties of Macromolecular Semiconductors", M. Jozefowicz and L-T. Yu, *Rev. Gen. Electr.,* 75 1008 (1966); "Preparation, Chemical Properties, and Electrical Conductivity of Poly-N-Alkyl Anilines in the Solid State", D. Muller and M. Jozefowicz, *Bull. Soc. Chem., Fr.* 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductors compositions having bulk electrical conductivities up to about $7 \times 10^{-3}$ S/cm and, surface resistivities of $4 \times 10^7$ ohm/square. European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and a suitable binder polymer.

U.S. Pat. No. 4,855,361 describes a conductive polymer blend which comprises mixing a polyimide with a base-type polymer containing carbon nitrogen linkages, such as polyaniline, having a polyimide-like group covalently linked to the nitrogen atoms of the base-type polymer. The conductive polymer blend is formed by first reacting a base-type non-conductive polymer containing carbon-nitrogen linkages, such as polyaniline, with a carbonyl anhydride, such as 3,3',4,4'-benzophenone tetracarboxylic dianhydride to form a conductive polymer containing polyimide-like groups conveniently linked to the nitrogen atoms of the base-type polymer mixing such conductive polymer with non-conductive polyamide in a suitable solvent, removing the solvent, and forming a conductive continuous phase blend of the polyimide and the conductive polymer.

U.S. Pat. No. 4,798,685 describes the production of base-type conductive polymers, particularly from the family of conductive polyaniline, by reacting a base-group non-conductive polymer containing carbon-nitrogen linkages, e.g. polyaniline, with an $R^+$donor compound, where R is an organic group, e.g. methyl iodide, and forming an electrically conductive polymer in which the R groups are covalently linked to the nitrogen atoms of the polymer.

U.S. Pat. No. 4,806,271 describes the production of base-type conductive polymers, particularly from the family of conductive polyaniline, by reacting a base-type non-conductive polymer containing carbon-nitrogen linkages e.g., polyaniline, with a cation donor compound, such as $R_2SO_4$, $R'SO_2Cl$ or $R''_3SiCl$, where R, R' and R'' are alkyl or aryl, such as dimethyl sulfate or tosyl chloride, and forming an electrically conductive polymer in which the R groups of $R_2SO_4$ and $R'SO_2$ groups of $R'SO_2Cl$, or the $R'_3Si$ groups of $R''_3SiCl$ are covalently linked to the nitrogen atoms of the polymer.

U.S. Pat. No. 4,822,638 describes a process for fabricating an electronic device on a non-conductive polymer substrate, particularly from the family of polyaniline, which comprises applying a covalent doping agent, such as an $R^+$donor compound, where R is an organic group, e.g., methyl iodide, to a preselected portion of a base-type non-conductive polymer substrate containing carbon-nitrogen linkages, and converting such preselected portion of the polymer substrate to an electrically conductive polymer portion, by covalent linkage of the R groups of such donor compound, to the nitrogen atoms of the non-conductive polymer substrate. Electronic devices, such as resistors, capacitors, inductors, printed circuits and the like, can be provided by the invention process, in the form of light-weight polymers containing no metal, and which are stable and wherein the conductive portions are non-diffusing.

U.S. Pat. No. 4,851,487 describes the production of base-type conductive polymers, particularly from the family of conductive polyaniline, by reacting a base-type non-conductive polymer containing carbon-nitrogen linkages, e.g., polyaniline, with an anhydride such as R—$SO_2$O—$SO_2$—R', R—CO—O—CO—R', R—CO—O—$SO_2$R' or mixtures thereof, where R and R' are alkyl or aryl, e.g., tosylic anhydride or benzophenone tetracarboxylic dianhydride, and forming an electrically conductive polymer in which the $SO_2$R and COR groups are covalently linked to the nitrogen atoms of the conductive polymer and the anion of the conductive polymers is the $SO_3$R' or $O_2$CR' group.

U.S. Pat. No. 4,798,685 describes the production of base-type conductive polymers, particularly from the family of conductive polyaniline, by reacting a base-type non-conductive polymer containing carbon-nitrogen linkages, e.g., polyaniline, with an $R^+$donor compound, where R is an organic group, e.g., methyl iodide, and forming an electrically conductive polymer in which the R groups are covalently linked to the nitrogen atoms of the polymer.

PCT WO89/01694 describes various of electrically conductive polyaniline doped with certain sulfonated dopants materials such as para-toluene-sulfonic acid. It is disclosed that these materials are thermally stable and can be melt blended with other polymers to form blends.

SUMMARY OF THE INVENTION

This invention relates to a process of forming conjugated backbone block copolymer comprising the steps of:

(a) polymerizing a first conjugated monomer by contacting said first monomer in a solvent with an effective amount of an effective oxidizing agent having an oxidation potential greater than the oxidation potential of said conjugated monomer to form a first conjugated backbone polymeric block comprising repeat units derived from said first conjugated monomer; and (b) contacting said first conjugated backbone polymeric block in a solvent with a second conjugated monomer in the presence of an effective amount of an effective oxidizing agent having an oxidation potential greater than that of said first conjugated backbone polymeric block to form a conjugated backbone block copolymer comprising said first conjugated backbone polymeric block and a second conjugated backbone polymeric block having at least two recurring monomeric units derived from said second conjugated monomer.

Step b can be repeated with appropriate conjugated monomers and oxidising agents capable of oxidising the conjugated backbone copolymer of the preceding step to form conjugated backbone block copolymers having any desired number of blocks.

As used herein "conjugated monomer" is a compound having conjugated unsaturation bonds and capable of being oxidized by oxidants having higher oxidation potentials than said monomer to form conjugated backbone polymeric block; and "conjugated backbone polymeric blocks" oligomers or polymers derived by the polymerization of the conjugated monomers and having at least two monomeric repeat units derived from same and comprised of alternating carbon-carbon double bonds (either singularly or as part of an aromatic ring structure), optionally incorporate heteroatoms such as oxygen, nitrogen, sulfur, selenium, phosphorous and the like along the polymer backbone.

As used herein, "effective oxidant" in the first step is a compound that has a higher oxidation potential than the first conjugated monomer and is capable of oxidizing the said conjugated monomer to induce couplings between the said monomers to form conjugated backbone polymeric blocks, and in the second step and subsequent steps has a higher oxidation potential than the conjugated backbone polymeric block conjugated backbone copolymer product of the preceding step, and capable of oxidizing said block or copolymer induce coupling between the second and subsequent monomers and the polymeric block or copolymer products of the preceding step, and "conjugated backbone copolymer" is a copolymer comprised of alternating carbon-carbon double bonds (either singularly or as part of an aromatic ring structure), optionally containing heteroatoms such as oxygen, nitrogen, sulfur, selenium, phosphorous and the like along the polymer backbone.

In the preferred embodiment of this invention, the polymerization of the first conjugated monomer in step (a) is performed in the presence of a "reactive substrate" to form a conjugated backbone polymeric block attached to a surface of the substrate, said block comprising repeating monomeric unit derived from the first conjugated monomer. The substrate is then placed in a solution of the second conjugated monomer, before or during polymerization of the second conjugated monomer with a suitable oxidant to form a conjugated backbone block polymer attached to the substrate comprising two blocks of repeating monomeric units derived from the corresponding first and second conjugated monomers. The procedure can be repeated to form a conjugated backbone copolymer having any number of conjugated backbone polymeric blocks.

A more preferred aspect of this invention relates to a process of forming a conjugated backbone copolymer on a substrate. This embodiment of the process of this invention comprises the steps of:

(a) a first solution of a first contacting conjugated monomer with an effective amount of one or more effective oxidizing agents with the proviso that at least one of the oxidizing agents has an oxidation potential higher than the oxidation potential of said first conjugated monomer the presence of a reactive substrate to form a first conjugated backbone polymeric block attached to said substrate, said first conjugated backbone polymeric block having at least two repeating units derived from the first type of conjugated monomer;

(b) separating said first solution and said substrate having said first conjugated backbone polymeric block attached thereto and contacting said substrate and a second solution comprising a second conjugated monomer which is different from said first conjugated monomer in the presence of an effective amount of one or more effective oxidizing agents which at least one of which has an oxidation potential higher than that of the first conjugated backbone polymeric block attached to said substrate to form a second conjugated backbone polymeric block derived from said second conjugated monomer attached to said first conjugated backbone polymeric block and (c) "n" times with "n" number of conjugated monomers to form a conjugated backbone copolymer having 2+n conjugated polymeric blocks.

As used herein "reactive substrate" is the substrate that can attach itself with the oligomer or polymers formed in the polymerization process via some physical or chemical interactions, such as hydrogen bonding, dipolar or ionic attractions, covalent bonding.

Another aspect of this invention relates to copolymers formed in accordance with the process of this invention and to articles fabricated from such copolymers.

The process of this invention exhibits one or more advantages over prior art processes. For example, this invention provides a feasible and yet very convenient process for making various novel block copolymers of conjugated backbone polymers in a controllable fashion. In contrast, the prior art processes provide only random copolymers. This invention also provides a tool for making bis-block or ter-block or even multi-block copolymers of conjugated backbone polymers with each repeating unit block having any desirable block lengths. This invention is particularly useful for making conjugated backbone copolymers having reactive and non-reactive monomeric repeating units. For example, the process of this invention can be used for making a ter-block copolymeric polyaniline having aniline (a highly reactive monomer) as the repeating monomeric unit of the first block, and 2-fluoroaniline (a very non-reactive monomer) as the repeating monomeric unit of the second block, and 2-methylaniline (a very reactive monomer) as the repeating monomeric unit of the third block.

The process of this invention may also be used to impart the desired conjugated backbone block copolymer with improved or additional properties. For example, one can incorporate a short conjugated backbone polymeric block formed from a conjugated monomer, such as thiophene, into polyaniline to give the conductive polyaniline a color other than green. As another example, one can add a short conjugated backbone polymeric block formed from a highly fluorinated aniline monomer to the unsubstituted polyaniline to reduce the surface energy of the more desired component, i.e. the polyaniline. Yet, another example, one can add a conjugated backbone polymeric block formed from a sulfonated aniline on the top of the unsubstituted polyaniline block to improve the thermal stability of the more desired component, i.e. the polyaniline.

DESCRIPTION OF THE PREFERRED EMBODIMENTS

The first step of the process of this invention comprises polymerizing a first substituted or unsubstituted conjugate monomer. In the first step of the process of this invention, to form the first conjugated backbone polymeric block, the polymerization is carried out by contacting the first conjugated monomer with an effective amount of an effective oxidizing agent having an oxidation potential greater than the oxidation potential of said first conjugated monomer in an organic or inorganic solvent for a time sufficient to form a conjugated backbone polymer having at least about 2 repeating units derived from said first conjugated monomer.

The method for contacting the various reactants may vary widely and any suitable method known to art may be employed. For example, the various reactants can be conveniently contacted by adding the oxidant solution to the conjugated monomer solution either dropwise or in portions. The various reactants may also be contacted, by adding the conjugated monomer solution to the oxidant solution. As another example, the conjugated monomer and oxidant can be contacted by dissolving or dispersing simultaneously in the same solvent or solvent mixture, followed optionally by the addition of different type of oxidant or oxidant solution.

In a preferred embodiment of the invention in the first polymerization step the reactions are contacted in the presence of a reactive substrate. Types of a reactive substrate may vary widely and any suitable reactive substrate may be used. Preferred reactive substrates are substrate that contain some nucleophilic function groups which can bond with the conjugated backbone copolymer or conjugated backbone polymer block as for example through covalent bonding, hydrogen bonding and dipolar or ionic attractions. These nucleophilic functional groups can be present throughout part or the whole, or merely concentrate on the surface or surface layer or surface layers of the substrate. These nucleophilic functional groups may be an essential component of the material or merely part of an additive or a coating. Illustrative of materials suitable for use as reactive substrates are polyesters such as polyethylene terephthalate, polybutylene terephthalate and poly(dimethylene cyclohexyl terephthalate, polyamides, such as nylon 6, nylon 66, nylon 6,10, polycarbonate, polyimide, polyvinyl chlorides, poly(vinylidene chloride), poly(vinylene fluoride), and the like, or polyethylene coated, or laminated with the above polymers, or polypropylene coated with some primers having some nucleophilic functional groups, or polybutadiene dyed with some dye molecules which contain some nucleophilic functional groups, or polystyrene containing plasticizers which contain these nucleophilic functional groups, and the like. Useful materials for formation of the reactive substrate also include inorganic materials, such as metal oxides, ceramics, marbles, clays, sands, inorganic salts, and the like.

Other useful substrates are those substrates that contain some conjugated group or segments which can be oxidized by the said oxidant and form a covalent bond with the said the conjugated monomer, the conjugated backbone polymeric block or the conjugated backbone block copolymer. These highly conjugated functional groups can be present throughout part or the whole material or merely concentrate on the surface or surface layer or surface layers. These highly conjugated functional groups can be either the essential component of the material or merely part of an additive or a coating. The useful material containing conjugated functional group can be and the conjugated monomer, the conjugated backbone polymeric block or the conjugated backbone block copolymer include conjugated conducting homopolymers or copolymers, such as substituted or unsubstituted polyacetylenes, polyanilines, polythiophenes, polypyrroles, polyfurans, polyphenylene vinylenes, polythienylene vinylenes, polypyrrolene vinylenes, polyfurylene vinylenes, and the like; or any organic or inorganic substrates coated or laminated with the above conducting polymers; or any organic or inorganic blends containing one or more the above conjugated conducting polymers or segments thereof, or any organic or inorganic material coated, dyed, or blended with some pigments or dye molecules and other highly conjugated molecules, such as dimeric or oligomeric aniline, bisthiophene, terthiophene, bisphenyl, terphenyl, and the like. Useful material can also be highly conjugated inorganic material or polymers, such as carbon black, graphite, carbon 60, fellerenes, polyphosphazene and the like.

The conjugated monomer is contacted with an "effective amount" of an "effective oxidizing agent". As used herein an "effective oxidizing agent" is an oxidizing agent capable of oxidizing said conjugated monomer or the said polymers and copolymers formed thereafter.

Suitable oxidizing agents may vary widely and any oxidation agent may be used. The oxidizing agent used in any situation will depend on the conjugated monomer being polymerized. In general, the oxidation potential of the conjugated monomer must be less than the oxidation potential of the oxidizing agent. Usually, the greater the different the oxidant potential, the more effective the oxidation. Illustrative of useful oxidizing agents are chromium oxide, chromic acid, sodium dichromate, potassium permanganate, chromyl acetate, ammonium peroxdisulfate, hydrogen peroxide, ferric chloride, potassium dichromate and the like. Preferred oxidizing agents for use in the practice of this invention are ammonium peroxydisulfate, hydrogen peroxide, ferric chloride, and the mixture thereof.

The oxidation is carried out with an "effective amount" of the oxidizing agent. As used herein, an "effective amount" of the oxidizing agent is an amount which is effective to form at least one polymer chain having at least 2 repeat units derived from said conjugated monomer.

Usually, the amount of oxidizing agent is from about 0.001 to about 200% by mole based on the mole number of said conjugated monomer although lower and higher amounts may be employed if they provide the desired results. In the preferred embodiments of the invention, the amount of oxidizing agent is from about 0.01 to about 150% by mole based on the total mole number of said conjugated monomer although lower and higher amounts may be employed if they provided the desired results, and in the most preferred embodiments of the invention, the amount of such agent is from about 1 to about 150% by weight of the aforementioned basis.

The oxidation reaction is carried out in a suitable solvent. Useful solvents may vary widely, the only requirement is that the solvent is capable of dissolving a sufficient amount of conjugated monomer although lower and higher amounts may be employed if they provide the desired results and oxidant at any given instant to perform the desired polymerization. Solvents which are relatively polar are preferred because, in general, they can dissolve a relatively larger amount of the desired monomers and oxidants. Preferred solvents have a dielectric constants measured at room temperature (i.e. 10°-30° C.) equal to or greater than 2.2. Illustrative of such useful solvents are water; dimethylsulfoxide; amides such as formamide, acetamide, N,N-dimethyl formamide, N,N-dimethyl acetamide, N-methyl pyrrolidinone, pyrrolidinone, and the like; alcohols and glycols such as methanol, ethanol, propanol, butanol, pentanol, hexanol, octanol, glycol, glycerol, propanediol, benzyl alcohol, cresol, phenol, cyclohexanol, 2-methoxyethanol, and the like; ketones, such as acetone, 2-butanone, 3-pentanone, cyclohexanone, 2,4-pentadione, acetophenone, benzophenone, and the like; amines, such as methylamine, dimethylamine, dipropylamine, triethylamine, dibenzylamine, picoline, and the like; nitro compounds of aliphatic and aromatic hydrocarbons such as nitromethane, nitroethane, nitrobenzene, nitrotoluene, nitroaniline, tetranitromethane, and the like; halogenated alphatic and aromatic hydrocarbons such as methylene chloride, chloroform, chloromethane, dibromoethylene, trichloroethane, chlorobenzene, o-difluorobenzene, bromotoluene and the like; esters such as methyl formate, ethyle acetate, ethyl acetoacetate, methyl benzoate, benzyl acetate, ethyl oleate, butyl stearate, methyl salicylate, dimethyl phthalate, and the like; ethers such as methyl ether, ethyl ether, phenyl ether, tetrahydrofuran, 1,4-dioxane, and the like; phosphates, such as tricresyl phosphate, and the like; and silicates such as tetraethylsilicate, and the like; More preferred solvents are those having a relative dielectric constant equal to or greater than about 3.0 such as water, dimethyl sulfoxide, amines, alcohols, ketones, and nitrohydrocarbons. Particularly preferred solvents are those having a relative dielectric constant equal to or greater than about 4.0, such as water, dimethyl sulfoxide, amines, and alcohols. The most preferred solvent is water due to environmental safety, and process economics.

Conjugated monomers for use in the practice of this invention may vary widely. Illustrative of such monomers are those of the formulas:

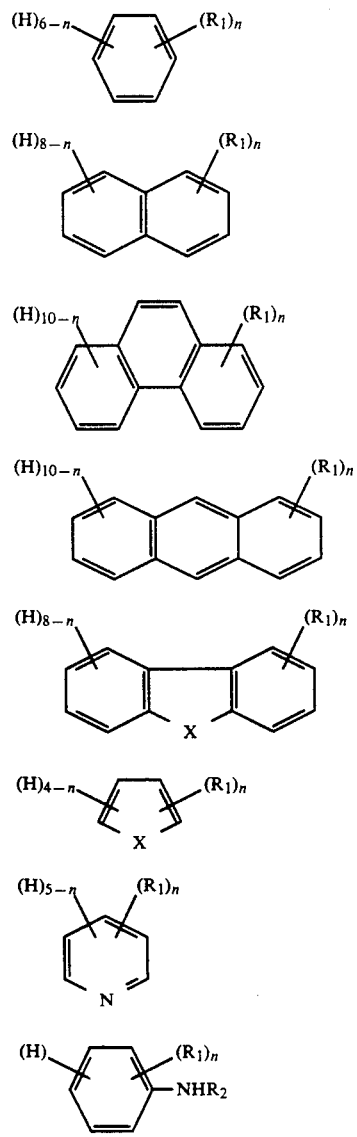

-continued

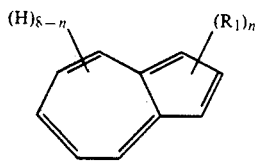

wherein:

$R_1$ and $R_2$ are the same and are different as defined below;

X is —O—, —S—, —Se—, —N($R_7$)—, —P($R_7$)—, —Si($R_7$)$_2$— or —B($R_7$)—, wherein $R_7$ is hydrogen or substituted or unsubstituted alkyl, aryl, alkoxy, aryloxy. Wherein the permissible substituents are deuterium or $R_1$; and n is equal to or greater than zero, with the proviso that n is selected such that the number of hydrogens is equal to or greater than zero.

Conjugated monomer preferred for use in the practice of this invention are anilines. Preferred anilines for use in the practice of this invention may vary widely. Illustrative of useful anilines are unsubstituted and substituted anilines of the Formula I:

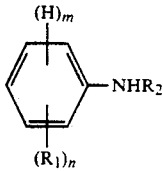

wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units such halo, hydrogen or other leaving group;

$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, carboxylate salts, borate salts, phosphate salts, sulfonate salts, phospinate salts, phosphonate salts, phosphonic acid, sulfonic acid, nitro, alkylsilane, or any of the foregoing aryl, aliphatic or cycloaliphatic groups substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two $R_1$ groups together or any $R_1$ group together with any $R_2$ group may form a substituted or unsubstituted alkylene, alkenylene or alkynynlene chain completing a 3, 4, 5, 6, 7, 9, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salts, phosphonate salt, phosphate salt, phosphinic acid, carboxylic acid, halo, nitro, amino, alkylamino, dialkylamino, arylamino, diarylamino, alkylarylamino, cyano or epoxy moieties; or $R_1$ is an aliphatic moiety having repeat units of the formula:

—(OCH$_2$CH$_2$)$_q$O—CH$_3$,
—(OCH$_2$CH(CH$_3$))$_q$O—CH$_3$, —(CH$_2$)$_q$CF$_3$,
—(CF$_2$)$_q$—CF$_3$ or —(CH$_2$)$_q$CH$_3$ wherein q is a positive whole number; and $R_2$ is selected from the group consisting of permissible $R_1$ substituents hydrogen.

The following listing of substituted and unsubstituted anilines are illustrative of those which can be used to prepare polymers and copolymers useful in the practice of this invention.

| | |
|---|---|
| 2-Cyclohexylaniline | 2-Acetylaniline |
| Aniline | 2,5-Dimethylaniline |
| o-Toluidine | 2,3-Dimethylaniline |
| 4-Propanoylaniline | N,N-Dimethylaniline |
| 2-(Methylamino)aniline | 4-Benzylaniline |
| 2-(Dimethylamino)aniline | 4-Aminoaniline |
| 2-Methyl-4-methoxy-carbonylaniline | 2-Methylthiomethylaniline |
| | 4-(2,4-Dimethylphenyl) aniline |
| 4-Carboxyaniline | 2-Ethylthioaniline |
| N-Methyl aniline | N-Methyl-2,4-Dimethylaniline |
| N-Propyl aniline | N-Propyl-m-Toluidine |
| N-Hexyl aniline | N-Methyl-o-Cyanoaniline |
| m-Toluidine | 2,5-Dibutylaniline |
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Thioacetylaniline |
| m-Hexylaniline | 2,5-Dichloroaniline |
| m-Octylaniline | 3-(n-Butanesulfonic acid) aniline |
| 4-Bromoaniline | |
| 2-Bromoaniline | 3-Propoxymethylaniline |
| 3-Bromoaniline | 2,4-Dimethoxyaniline |
| 3-Acetamidoaniline | 4-Mercaptoaniline |
| 4-Acetamidoaniline | 4-Ethylthioaniline |
| 5-Chloro-2-methoxy-aniline | 3-phenoxyaniline |
| 5-Chloro-2-ethoxy-aniline | 4-phenoxyaniline |
| N-Hexyl-m-toluidine | N-Octyl-m-toluidine |
| 4-Phenylthioaniline | 4-Trimethylsilylaniline |
| 3-Amino-9-methylcarbazole | 3-Amino carbazole |
| 4-Amino carbazole | N-(p-Amino phenyl) aniline |

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio. octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxpropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitro benzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

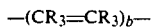

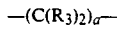

wherein $R_3$ is the same or different at each occurrence and is hydrogen or alkyl, as for example $-(CH_2)_4-$, $-(CH_2)_3-$, $-(CH=CH-CH=CH)-$, $-[CH_2-CH(CH_3)-CH_2]-$ and $-(CH_2)_5-$, and groups comprised of such moieties which include one or more heteroatoms of oxygen, nitrogen, ester, sulfonyl, carbonyl, sulfinyl, and/or sulfur, such as $-CH_2SCH_2-$ $-CH_2NHCH_2-$, $-SCH_2NHCH_2-$, $-O-CH_2-CH_2O--O-CH_2-S-CH_2-$, $-CH_2S(O_2)CH_2-$, $-CH_2S(O)CH_2-$, $-OC(O)CH_2CH_2-$, $-CH_2C(O)CH_2-$ and $-CH_2-O-CH_2-$ to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran, aminobenzodiazine, benzthiopyrone amine, amino-coumarin, benzthiopheneamine, benzothiodiazoleamine, and the like. Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsufonyl such as methylsulfonyl, ethylsulfonyl, propylsulfonyl and the like; arylsulfonyl such as phenylsulfonyl, p-methyl phenylsulfonyl, naphthylsulfonyl and the like.

Preferred for use in the practice of this invention are anilines of the above Formulas I in which:

n is an integer from 0 to about 2;

m is an integer from 2 to 4, with the proviso that the sum of n and m is equal to 4;

$R_1$ is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, diarylamino, alkylarylamino, or alkyl or aryl or alkoxy substituted with phosphinic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salts, carboxylic acid or sulfonic acid substituents;

$R_2$ is the same or different at each occurrence and is a $R_1$ substituent or hydrogen;

Particularly preferred for use in the practice of this invention are anilines of the above Formula I in which:

n is an integer from 0 to 1;

M is an integer from 3 to 4, with the proviso that the sum of n and m is equal to 4;

$R_1$ is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents; and $R_2$ is the same or different at each occurrence and is a $R_1$ substituent or hydrogen.

Amongst the particularly preferred embodiments, most preferred for use in the practice of this invention are polyanilines of the above Formula I in which:

n is an integer from 0 to 1;

m is an integer from 3 to 4, with the proviso that the sum of n and m is equal to 4;

$R_1$ is aryl, alkyl, alkoxy, amino, alkylamino, dialkylamino, arylamino, diarylamino, alkylarylamino, halo, sulfonic acid, sulfonate salt, carboxylic acid or carboxylate salt, or alkyl or aryl substituted with one or more sulfonic acid, carboxylate salt, amino, alkylamino, dialkylamino, arylamino, diarylamino, halo, alkylarylamino, sulfate salt, sulfonate salt, or carboxylic acid substituents, wherein the aromatic moieties include from 6 to about 21 carbon atoms and the aliphatic moieties include from 1 to about 15 carbon atoms; and $R_2$ is hydrogen.

In the most preferred embodiments of this invention, the aniline is unsubstituted aniline, and halogen, alkoxy, alkyl, or sulfonic acid substituted aniline.

In the preferred embodiments, the polymer is polyaniline. As used herein, "polyaniline" consists of repeat units of the Formulas II and III

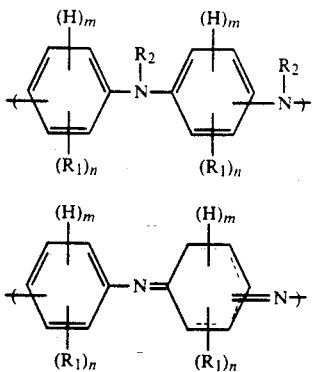

or a combination thereof having various ratios of the above repeat units in the polyaniline backbone such as leucoemeraldine, protoemeraldine, emeraldine, nigraniline and pernigraniline.

Illustrative of the polyanilines useful in the practice of this invention are those of the Formulas IV to VII;

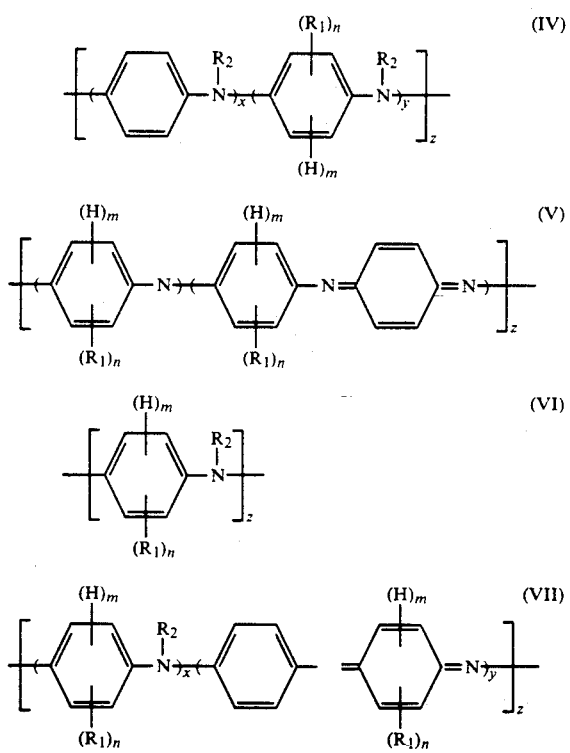

wherein:

n, m, $R_1$ and $R_2$ are as described above;

x and y are the same or different at each occurrence and are integers equal to or greater than 0, with the proviso that the sum of x and y is greater than 0, preferably were x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than 1.

Preferred for use in the practice of this invention are polyanilines of the above Formulas IV to VII in which:

n is an integer from 0 to about 3;

m is an integer from 1 to 4, with the proviso that the sum of n and m is equal to 4;

$R_1$ is alkyl, aryl or alkoy having from 1 to about 30 carbon atoms, sulfinic acid, sulfinate, sulfinic acid salt, amino, alkylamino, dialkylamino, arylamino, diarylamino, hydroxyamino, hydroxy, phosphinate alkylsulfonyl, arylsulfonyl, sulfonic acid, sulfonate, phosphinic acid, phosphinic acid salt, phosphinate carboxylic acid, carboxylate, phosphinic acid, phosphonate, phosphonic acid salt, cyano, halo, or alkyl, aryl or alkoxy substituted with one or more phosphonic acid, phosphoric acid, borate, sulfonate, carboxylate, phosphonate, phosphonic acid salt, boric acid, phosphinic acid, phosphinate, phosphinic acid salt, sulfinic acid, sulfinate, sulfinic acid salt, carboxylic acid or sulfonic acid substituents;

$R_2$ is the same or different at each occurrence and are hydrogen, sulfinic acid, sulfinic acid salt, sulfonate, sulfinate, sulfonic acid, phosphinic acid, phosphinate, phosphinic acid salt, carboxylic acid, carboxylate, phosphonic acid, phosphonate, phosphonic acid salt, or phenyl or alkyl substituted with sulfonic acid, sulfonate, phosphinic acid, phosphinate, phosphonic acid salt, carboxylic acid, carboxylate, sulfinic acid, sulfinate, sulfinic acid salt, boric acid, borate, phosphonic acid or phosphonate, phosphonic acid salt substituents;

x is an integer equal to or greater than 1;

y is equal to or greater than 0, with the proviso that the ratio of x to y is equal to or greater than 0.5;

z is an integer equal to or greater than about 5;

Particularly preferred for use in the practice of this invention are polyanilines of the above Formulas IV to VII in which:

n is an integer from 0 to 2;

m is an integer from 2 to 4, with the proviso that the sum of n and m is equal to 4;

$R_1$ is alkyl, alkoxy, amino, alkylamino, dialkylamino, arylamino, diarylamino, hydroxyamino, hydroxy, alkylsulfonyl, arylsulfonyl, carboxylic acid, carboxylate, phosphinic acid salt, phosphinic acid, sulfonic acid, sulfonate, sulfinic acid, phosphonic acid, sulfonic acid salt, phosphonic acid salt, or alkyl substituted with carboxylic acid, phosphinic acid, sulfinic acid, phosphinic acid salt, halo, sulfinic acid salt, sulfonate, carboxylate, phosphonic acid, phosphonic acid salt, or sulfonic acid substituents; wherein the aliphatic components of $R_1$ substituents include from 1 to about 30 carbon atoms and the aryl components of any $R_1$ substituent include from 6 to about 30 carbon atoms;

$R_2$ is the same or different at each occurrence and are hydrogen, alkyl, carboxylic acid, amino, alkylamino, dialkylamino, arylamino, diarylamino, hydroxyamino, hydroxy, alkylsulfonyl, arylsulfonyl, sulfinic acid, sulfonic acid salt, carboxylate, phosphinic acid salt, sulfonic acid, phosphonic acid, sulfinic acid salt, phosphonic acid salt, or alkyl substituted with one or more carboxylic acid, sulfinic acid, sulfinic acid salt, carboxylate, phosphinic acid salt, phosphinic acid, sulfonic acid, sulfinate salt, phosphonic acid or phosphonic acid salt substituents; wherein the aliphatic components of any $R_2$ substituent include from 1 to about 30 carbon atoms and the aryl components of any $R_2$ substituent include from 6 to 30 carbon atoms;

x is an integer equal to or greater than 2;

y is equal to or greater than 0, with the proviso that the ratio of x to y is greater than about 1; and z is an integer equal to or greater than about 10.

Amongst the particularly preferred embodiments, most preferred for use in the practice of this invention are polyanilines of the above Formulas V or VII in which:

n is an integer from 0 to 1;

m is an integer from 3 to 4, with the proviso that the sum of n and m is equal to 4;

$R_1$ is alkyl of from 1 to about 20 carbon atoms, carboxylic acid, carboxylate, sulfonic acid, sulfonate, sulfinic acid, sulfinic acid salt, phosphonic acid, phosphinic acid salt, or alkyl of from 1 to about 20 carbon atoms substituted with one or more halo, carboxylic acid, carboxylate, sulfonic acid, sulfonate, sulfinic acid, sulfinic acid salt, phosphinic acid or phosphinic acid salt, phosphonic acid, phosphonic acid salt, substituents;

$R_2$ is carboxylic acid, methyl, ethyl, carboxylate, carboxylic acid, sulfonic acid, sulfonate, sulfinic acid, phosphinic acid, phosphinic acid salt, sulfinate, phosphonic acid, phosphonic acid salt, salt or hydrogen;

x is an integer equal to or greater than 2; and y is an integer equal to or greater than 1, with the proviso that the ratio of x to y is greater than about 1; and z is an integer equal to or greater than about 10.

In the most preferred embodiment of the invention n is 0;

m is 4;

x is an integer equal to or greater than 2;

y is an integer equal to or greater than 1 with the proviso that the ratio of x to y is greater than 1; and z is an integer equal to or greater than about 10.

The oxidation is carried out for a time sufficient to form a conjugated backbone or copolymer having at least two conjugated polymeric blocks, an average number of repeating units from about 2 to about $10^8$ or greater. This will usually require from about a fraction of a second to about several hours. In the preferred embodiments of the invention, the oxidation is continued until the average number of repeating units is from about 2 to about $10^6$ usually for from about 2 to about $10^5$. Reaction temperatures and pressures may vary widely. Usually for convenience, the reaction is carried out at ambient temperature, i.e. from about 5° to about 30° C., and at atmospheric pressure.

The first step of the process of this invention can be carried out in the presence or absence of a dopant. When step one is carried out in the absence of a dopant the resulting conjugated backbone polymeric segment is neutral; however, when the step one is carried out in the presence of the dopant the segment is doped and conductive. In general, the longer the segment, the more conductive the segment will be when doped.

Useful dopants may vary widely, in general, such dopant solute is derived from a compound, which upon addition to the conjugated backbone polymer, creates charge carriers (holes or free electrons) on the conjugated backbone polymer and renders the polymer conductive. Useful dopants include "oxidizing dopants" and "reducing dopants". As used herein an "oxidizing dopant" is a dopant which renders the conjugated backbone polymer with desired conductivity via an oxidation step. As used herein an "reducing dopant" is a dopant which renders the conjugated backbone polymer with desired conductivity via a reduction step. Oxidizing dopants and reducing dopants are well known in the conductive polymer art, and any of such known oxidizing dopants and reducing dopants can be used. Dopants for use in the practice of this invention can vary widely and can be such materials which are known in the art for use in doping conjugated backbone polymers to form conductive or semi-conductive polymers, as for example, those described in detail in U.S. Pat. Nos. 4,442,187 and 4,321,114 which are hereby incorporated by reference.

Useful reducing dopants are alkali metals, such as Li, Na, K, Rb, Cs, Fr, and the mixture thereof; alkaline-earth metals, such as Be, Mg, Ca, Sr, Ba, Ra, and the mixture thereof; the complexes formed between such alkali or alkaline-earth metals and some highly conjugated compounds, such as benzene, naphthalene, phenanthrene, anthracene, and other polynuclear aromatics, and the like; and ammonium solution of such alkali and alkaline metals and the like. Preferred reducing dopant for use in the practice of this invention are the complexes formed between alkali or alkaline metals and some highly conjugated compounds, such as napththalene.

Illustrative of useful dopants species are oxidizing dopants. Oxidizing dopants are well known in the conductive polymer art, and any of such known oxidizing dopants can be used.

Illustrative of useful oxidizing dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2CF_3SO_2$), $HClO_4$, $HNO_3$, $H_2SO_4$, benzoylperoxide, $SO_3$, $Br_2$, $(FSO_3)_2$, $ZnCl_2$, $FSO_3H$, and Fe(III) salts (such as $Fe(BF_4)_3$, $FeBr_3$, $Fe(CH_3SO_3)_3$, $Fe(ClO_4)_3$, $FeCl_3$, $Fe(OTs)_3$, and $Fe(CF_3SO_3)_3$ which give rise to doped polymers containing dopant ions such as $NO_3^-$, $CH_3SO_3^-$, $AlCl_4^-$, $BF_4^-$, $ZnCl_4^-$, $PCl_4^-$, $PF_6^-$, $AsF_6^-$, $SbF_6^-$, $CF_3SO_3^-$, $ClO_4^-$, $OTs^-$, $SO_3^{-2}$, $C_6H_5CO_2^-$, $CH_3SO_3^-$, $FSO_3^-$, and $FeCl_4^-$. Other useful oxidizing dopants include electrolyte salts such as $LiClO_4$, $LiBF_4$, $LiAsF_6$, $NaPF_6$, $Bu_4NClO_4$, $BuNOTs$, $Bu_4NCF_3SO_3$, $LiCF_3SO_3$, $AgOTs$, and the like. Preferred oxidizing dopants for use in the practice of this invention are oxidizing dopants selected from the group consisting of $MoOCl_4$, $MoCl_5$, $PCl_5$, $POCl_3$, and Fe (III) salts such as $Fe(ClO_4)_3$, $FeCl_3$, $FeBr_3$, and $Fe(CF_3SO_3)_3$, and particularly preferred oxidizing dopants for use in the practice of this invention are dopants selected from the group consisting of $MoOCl_4$, $MoCl_5$, $PCl_5$, $POCl_3$, $FeBr_3$ and $FeCl_3$. Amongst these particularly preferred embodiments, most preferred oxidizing dopants are those embodiments in which the oxidizing dopant is $FeCl_3$.

Illustrative of other dopants are oxidizing protonic acid dopants. Such dopants include inorganic acid, hydrofluoric acid, hydroiodic acid, phosphoric acid, nitric acid, iodic acid, sulfuric acid and the like.

Illustrative of still other useful dopants are non-oxidizing protonic acids such as those of containing anionic moieties of the formula:

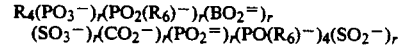

and having one or more cationic moieties selected from the group consisting of:

$$M^{+s}$$

wherein:

$R_4$ and $R_6$ are the same or different at each occurrence and are organic radical or amino;

M is a species having a positive charge equal to s, provided that at least one of $M^{+s}$ is a proton or a moiety which can be transformed by radiation, heat, chemicals and the like into a proton under use conditions such as $NH_4{}^+$, $^+N(CH_3)_2H_2$, $^+N(C_2H_5)H_3$, $Ph_3S^+$ and the like;

s is the same or different at each occurrence and is an integer equal to 1 to 8;

r is the same or different at each occurrence and is 0 or a positive integer equal to or greater than 1, with the proviso that at least one of r is other than 0.

The $R_4$ and $R_6$ group may vary widely and can be a substituted or unsubstituted aliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. $R_4$ and $R_6$ groups may also be a polymeric radical such as a polymer having recurring pendant phenyl groups in the polymeric backbone substituted with sulfonic acid and derivatives thereof such as salts, phosphoric acid and derivatives thereof such as salts, phosphonic acid and derivatives thereof such as salts, sulfinic acid and derivatives thereof such as salts, carboxylic acid and derivatives thereof such as salts, boric acid and derivatives thereof such as salts, or phosphonic acid and derivatives thereof such as salts; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, $R_4$ and $R_6$ are aromatic radical and in the most preferred embodiments $R_4$ and $R_6$ are substituted or unsubstituted phenyl or naphthyl. The nature of the $M^{+s}$ group may vary widely. For example, $M^{+s}$ may be a non-metal cation such as $Bu_4N^+$, $H^+$, $NO^+$, $NO_2{}^+$, $NH_4{}^+$, $^+N(CH_3)_2H_2$, $^+N(C_2H_5)H_3$, $Ph_3S^+$ and the like, or may be a metal cation such as $Na^+$, $Li^+$, $Ag^+$, $Ba^{+2}$, $Co^{+3}$, $Al^{+3}$, $Fe^{+3}$ and the like.

Preferred for use in the practice of this invention are organic acid dopants, more preferably those having anionic moieties of the formulas:

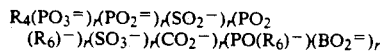

and having a cationic moiety of the Formula:

wherein at least one of the cationic moieties of the formula $M^{+s}$ is a proton or is a moiety which can be transformed into a proton under use conditions;

$M^{+s}$ is a cationic species having a positive charge s;

s is an integer equal to or greater than 1, preferably from 1 to about 8;

$R_4$ and $R_6$ are organic radicals or amino, and r is an integer equal to or greater than 1, preferably from 1 to about 8;

More preferred for use in the practice of this invention as dopants are acids or acid derivatives of the formula:

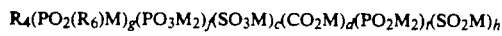

or

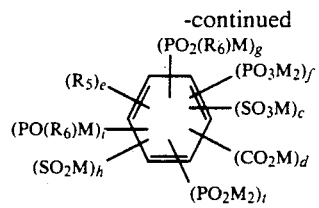

wherein:

M is $H^+$, or other metal or non-metal cation with the proviso that at least one of M is $H^+$ or a moiety which can be thermally or chemically transformed into a proton under use conditions, such as $^+NH_4$, $^+N(CH_3)_2H_2$, $^+(C_2H_5)H_3$, $Ph_3S^+$ and the like t is 0, 1, 2, 3 or 4;
h is 0, 1, 2, 3 or 4;
i is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4, with the proviso that at least one of c, d, f, g, h, i or t is other than 0;
e is 0, 1, or 2; and $R_4$ and $R_5$ are the same or different at each occurrence and are nitro, cyano, hydroxy, halo, amino, alkylamino, dialkylamino, arylamino, diarylamino, alkylarylamino, alkoxy, or substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid, phosphate salt, boric acid, sulfinate salt, phosphinate salt, sulfinic acid, borate salt, phosphinic acid, phosphonate salt, phosphonic acid, carboxylic acid, nitro, carboxylate salt and the like, or any two $R_6$ or any two $R_5$, or $R_4$ and any $R_6$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or $R_4$ or $R_5$ is a moiety of the formula:

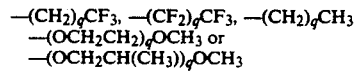

wherein:

q is a positive whole number from 1 to about 10; and $R_6$ is alkyl, aryl, aryloxy or alkoxy.

In the particularly preferred embodiment of this invention, useful dopants are acids and/or acid derivatives of the above formula:

or

-continued

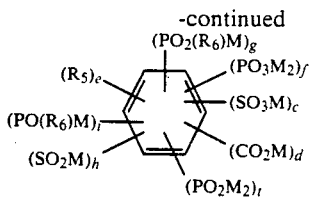

wherein:

c is 0, 1, 2 or 3;

d, t, f, g, h and i are the same or different at each occurrence and are with the proviso that at least one of c, d, t, f or g, i or h is other than 0;

e is 0, 1 or 2;

$R_4$ and $R_5$ are the same or different are hydroxy, amino, alkylamino, dialkylamino, arylamino, diarylamino, alkyl aryl amino, substituted or unsubstituted phenyl or alkyl wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphiniate salt, sulfonic acid, carboxylic acid, phosphoric acid, sulfinic acid or sulfinate salts or any two $R_6$, or any two $R_5$ or $R_4$ and any $R_6$ substituents together may form an unsubstituted or substituted or alkenylene chain completing a naphthalene, anthracene or phenanthrene fused ring system wherein permissible substituents are as described above or $R_4$ or $R_5$ is a moiety of the formula:

$$-(CH_2)_qCF_3, -(CF_2)_qCR_3, -(CH_2)_qCH_3,$$
$$-(OCH_2CH_2)_qOCH_3 \text{ or } -(OCH_2CH(CH_3))_q OCH_3$$

wherein:

q is a positive whole number from 1 to about 10;

$R_6$ is alkyl, alkoxy, aryloxy or aryl; and

M is $H^+$, or other metal or non-metal cation, with the proviso that at least one of M is $H^+$ or a moiety which can be thermally or chemically transformed into a proton under use conditions.

In the most preferred embodiments of this invention, useful dopants are acids and/or acid derivatives of the formula:

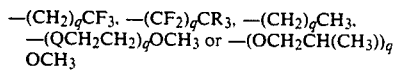

or

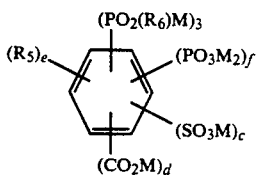

wherein:

c, d, e, f and g are the same or different and are 0, 1 or 2, with the proviso that at least one of c, d, f and g is not 0;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphonic acid, phosphinate salt, phosphonate salt, amino or carboxylic acid groups, or phenyl substituted with one or more alkyl, alkoxy, fluoroalkyl, sulfonic acid, phosphinic acid, phosphonic acid, phosphinate salt, phosphonate salt, sulfonate salt, carboxylate, hydroxy, nitro, cyano, or carboxylic acid groups or any two $R_6$, or $R_4$ and any $R_6$, or any two $R_5$, substituents together may form an alkylene or alkenylene chain completing a naphthalene, anthracene or phenanthrene fused system which may be substituted with one or more alkyl, alkoxy, fluoro, phosphinic acid, phosphinate salt, phosphonic acid, phosphonate salt, fluoroalkyl, sulfonic acid, sulfonate salt, carboxylic acid, carboxylate salt, hydroxy, nitro, amino or cyano groups;

$R_6$ is aryl, aryloxy, alkyl or alkoxy; and

M is $H^+$ or other metal or non-metal cation, with the proviso that at least one of M is $H^+$ or is a moiety which can be thermally transformed into a proton under process conditions.

In the especially preferred embodiments of this invention, useful dopants are acids or acid derivatives of the formula:

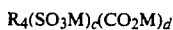

or

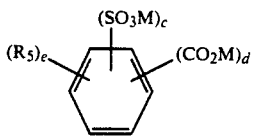

wherein:

c is 1, 2 or 3;

d is 1, 2 or 2 with the proviso that at least one of c, d is not 0 e is 0, 1 or 2;

$R_4$ and $R_5$ are the same or different at each occurrence and are hydroxy, dialkylamino, diarylamino, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate, amino or carboxylic acid groups, or phenyl substituted with one or more alkyl, alkoxy, fluoroalkyl, dialkylamino, diarylamino, alkylarylamino, sulfonic acid, alkylamino, arylamino, sulfonate salt, carboxylate salt, hydroxy, phosphinate acid, phosphinate salt, nitro, cyano, amino or carboxylic groups; or any two $R_5$ substituents together may form an alkylene or alkenylene chain completing a naphthalene, anthracene or phenanthrene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylamino, dialkylamino, arylamino, diarylamino, alkylarylamino, or cyano groups;

M is $H^+$ or other metal or non-metal cation or a moiety which can be thermally tranformed into a proton under process conditions.

In the process of the embodiment of this invention of choice, the dopant is a sulfonic acid or sulfonic acid derivative of the formula:

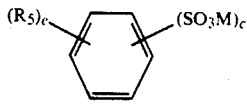

wherein;

c is 1, 2 or 3;

e is 0, 1 or 2;

$R_5$ is alkyl or alkyl substituted with one or more fluoro groups, or any two $R_5$ groups together may form an alkenylene chain completing a naphthalene fused ring system which may be substituted with one or more sulfonic acid, sulfonic salt group or a combination thereof; and M is a proton, or other metal or non-metal cation, with the proviso that at least one of M is proton.

The following is a listing of dopants which are useful in the practice of the most preferred embodiments of this invention for formation of the dopant ion.

1-anthracene sulfonic acid,
9-anthracene sulfonic acid,
2-phenanthracene sulfonic acid,
3-phenanthracene sulfonic acid,
9-phenanthracene sulfonic acid,
$NO_2CF_3SO_3$,
$CF_3SO_3H$,
perflourooctyl sulfonic acid,
perflourooctyl carboxylic acid,
octylsulfonic acid,
dodecylsulfonic acid,
cetylsulfonic acid,
toluenesulfonic acid (TsOH),
$Fe(OTs)_3$,
$Fe(CH_3SO_3)_3$,
$(FSO_3)_2$,
AgOTs,
$Me_3SiOTs$,
dodecylbenzene sulfonic acid,
naphthalene sulfonic acid,
benzene disulfonic acid,
benzene sulfonic acid,
1,3-benzene disulfonic acid,
2,5-dihydroxy-1,4-benzene disulfonic acid,
camphor sulfinic acid,
naphthalene trisulfonic acid,
dodecylbenzene sulfonic acid,
ethane sulfonic acid,
1,5-naphthalene disulfonic acid,
nickel phthalocyanine tetrasulfonic acid,
phenyl phosphonic acid,
diphenyl phosphinic acid,
phenyl phosphinic acid,
3-sulfopropyl acrylate,
3-sulfopropyl methacrylate,
sulfamic acid,
5-sulfosalicyclic acid,
trion (4,5-dihydroxy-1,3-benzene disulfonic acid),
vinyl sulfonic acid,
sulfanilic acid,
4-sulfophthalic acid,
sulfoacetic acid,
methyl phosphinic acid,
phenylphosphonic acid,
methyl phosphonic acid,
methyl orange,
sulfonated polystyrene,
sulfonated poly(2-vinyl naphthalene),
naphthol yellow,
naphthol blue black,
1,2-naphthoquinone-4-sulfonic acid,
naphthylazoxine S,
1-octane sulfonic acid,
t-butyl phosphonic acid,
ethyl phosphonic acid,
butyl phosphonic acid,
1,2-benzene disulfonic acid,
4-octylbenzene sulfonic acid,
2-mesitylene sulfonic acid,
2,6-naphthalene disulfonic acid,
2-naphthalene sulfonic acid,
1,3,6-naphthalene trisulfonic acid,
1,3,7-naphthalene trisulfonic acid,
sulfonazo III acid,
biphenyl disulfonic acid,
biphenyl sulfonic acid,
1,8-dihydroxynaphthalene-3-6-disulfonic acid,
3,-dihydroxynaphthalene-2,7-disulfonic acid,
4,5-dihydroxynaphthalene-2,7-disulfonic acid,
6,7-dihydroxy-2-naphthalene sulfonic acid,
1-naphthalene phosphoric acid,
1-naphthalene sulfonic acid,
1-naphthalene-5,7-dinitro-8-hydroxy,
1-napthalene-4-hydroxy sulfonic acid,
4-bromobenzene sulfonic acid,
4-hydroxy-5-isopropyl-2-methylbenzene sulfonic acid,
3,4-diaminobenzene sulfonic acid,
benzenephosphoric acid,
1,3,5-benzene trisulfonic acid,
2-methyl-5-isopropylbenzene sulfonic acid,
3,4-dinitrobenzene sulfonic acid,
2-methoxybenzene sulfonic acid,
1-naphthalene-5-hydroxy sulfonic acid,
1-naphthalene-7-hydroxy sulfonic acid,
1-naphthalene-3-hydroxy sulfonic acid,
2-naphthalene-1-hydroxy sulfonic acid,
4-phenylaminobenzene sulfonic acid,
1,6-naphthalene disulfonic acid,
1,5-naphthalene disulfonic acid,
1,3-naphthalene-7-hydroxy disulfonic acid, and
$Me_3SiOSO_2CF_3$.

The amount of dopant added to the polyaniline is not critical and may vary widely. In general, sufficient dopant is added to the polyaniline to at least form doped polymer which is a semi-conductor which has a conductivity of at least about $10^{-9}$ ohm$^{-1}$cm$^{-1}$ as measured by the four-in-line probe method as described in "Laboratory Notes on Electrical Galvanometric Measurement" by H. H. Wieder, Elsevier Scientific Publishing Co. New York, New York (1979). The upper level of conductivity is not critical and will usually depend on the type of aniline polymer employed. In general, the highest level of conductivity obtained is provided without unduly adversely affecting the environmental stability of the polymer. In the preferred embodiments of the invention the amount of dopant employed is sufficient to provide a conductivity of at least about $10^{-6}$ohm$^{-1}$cm$^{-1}$ and in the particularly preferred embodiments is sufficient to provide a conductivity of from about $10^{-2}$ohm$^{-1}$cm$^{-1}$ to about $10^{+2}$ohm$^{-1}$cm$^{-1}$. Amongst these particularly preferred embodiments, most preferred are those embodiments in which unsubstituted polyaniline is employed and in which sufficient dopant is employed to provide a conductivity of at least about $10^{-1}$ohm$^{-1}$cm$^{-1}$ to about $10^{+2}$ ohm$^{-1}$ cm$^{-1}$, with amounts sufficient to provide a conductivity from about $10^0$ ohm$^{-1}$ cm$^{-1}$ to about $10^{+2}$ ohm$^{-1}$ cm$^{-1}$ usually being the amounts of choice.

The method of doping the conjugated backbone polymers segment is not critical and may vary widely. Suitable techniques are those described in U.S. Pat. Nos. 4,442,187 and 4,321,114. Such processes include the direct chemical polymerization molecules of Formula 1 in the presence of dopant molecules, which have anion components such as $[R_4(SO_3^-)_r]$, $[R_4(SO_2^-)_r]$, $[R_4(OPOR_6^-)_r]$, $[R_4(BO_2^=)_r]$, $[R_4(POR_6^-)_r]$ $[R_4(BO_2H^-)_r]$, $[R_4(PO_3^=)_r]$ or mixtures thereof. Also such process include electrochemical doping of 30 neutral polyaniline as described in U.S. Pat. No. 4,321,114. Another process is electrochemical polymerization of aniline and its derivatives as described in Formula I in the presence of $[R_1SO_3^-]_nM^{+n}$ are described in Kobayashi, et al., *J. Electroanal. Chem.*, "Electrochemical Reactions Concerned with Electrochromism of Polyaniline Film-Coated Electrodes", 77, pp. 281–291 (1984). Yet another process of forming the conductive polyaniline of this invention involves the exchange of non-thermally stable dopants in polyaniline with a thermally stable dopant containing anion components such as $R_4(SO_3^-)_r$, $R_4(OPO_2^=)_r$ and/or $R_4(O_2POH^-)_r$. For example, in this process polyaniline can be doped by contacting same with a solution containing excess of a dopant molecule which has anion component such as $R_4(SO_3^-)_r$, $R_4(OPO_2^=)_r$ and $R_4(O_2POH^-)_r$.

In the process of this invention subsequent blocks of recurring conjugated backbone polymeric units are formed by repeating steps with other types of conjugated monomer, including any previous used conjugated monomer except the very last one, to form the desired conjugated backbone copolymer block. The formed block copolymer may be either conductive or non-conductive depending on whether the dopant is also presence in the polymerization media. This procedure can be repeated any number of times to form conjugated backbone block copolymers having the desired number of blocks having the desired type of repeating backbone polymeric units. If the final copolymer is neutral (i.e. non-conductive), it can thereafter be doped with a suitable dopant as described above to form an electrically conductive block co-polymer. In the preferred embodiments of the invention the remaining conjugated backbone polymeric blocks are formed from aniline.

The electrically conductive polyaniline of the invention, and the composition of this invention can be used for any purpose for which conductive polymers are useful. Examples of articles include conductive polymer housings for EMI Shielding of sensitive electronic equipment such as microprocessors, infrared, radio frequency and microwave absorbing shields, flexible electrical conducting connectors, conductive bearings, brushes and semiconducting photoconductor junctions, electrodes, capacitors, optically transparent or non-transparent corrosion-preventing coatings for corrodible materials such as steel, antistatic materials and optically transparent or non-transparent coatings for packaging electronic components, carpet fibers, waxes for floors in computer rooms, antistatic finishes for CRT screens, aircraft, auto windows, electrostatic dissapative packaging for electronics, and the like.

Various other applications are anticipated for the conducting coatings produced by the present processes, such as in conducting plastic gas tanks; solar window coatings; transparent electrical elements for heated windows and heated liquid crystal displays; electrochromic displays, electrical contacts for electroluminescent displays and electroluminescent lights, and electrical contacts for piezoelectric films for transparent loud speakers; transparent conducting coatings for windows in burglar alarm systems; membrane coatings for chemical separations (such as $O_2$ and $N_2$, for example); and conducting coatings for membrane switches; and a discharge layer or photoresist layer for lithographic process.

Specifically useful coating of conducting polymers are those which are transparent in the visible spectral region. By transparent in the visible region, we mean that at least 30% of the solar energy spectrum in the visible region is transmitted by the coating. Since transparency is inversely related to conducting polymer thickness, a desired degree of transparency can be obtained by limiting the thickness of this layer, such as by limiting contact time with initiator or with monomer and oxidizing agent. Dual pane windows for the control of solar heating are a particularly useful application area for use of the present process for depositing transparent conjugated polymer coatings.

The following specific examples are presented to more particularly illustrate the invention, and should not be construed as being limitations on the scope and spirit of the invention.

EXAMPLE 1

A piece of nylon film ($3 \times 3$ inch) was embedded with N-phenyl-1,4-phenylene diamine as the initiator by soaking the film in a solution containing 2 g of N-phenyl-1,4-phenylene diamine and 150 mL methanol for half an hour. This embedded film was then rinsed with methanol to remove any initiator solution residue from the surface and then air-dried. A pink-brown nylon film was obtained.

EXAMPLE 2

The initiator (N-phenyl-1,4-phenylene diamine) embedded nylon film prepared in Example 1 was air-dried for half an hour, and then soaked in a 100 mL aqueous solution containing 2.32 g aniline and 9.51 g p-toluene sulfonic acid.

Then 0.4 mL of ammonium peroxydisulfate solution, APS, (prepared by dissolving 157 g ammonium peroxydisulfate in 270 mL deionized water) was added dropwisely into the above solution to induce the polymerization of aniline. The polymerization initiated preferentially from the embedded initiator, evidenced by the appearing of blue color on the film and in its surrounding area within about 30 seconds: while the rest of the solution stayed colorless for about 2 minutes.

After 64 minutes the addition of APS solution, the polyaniline-coated green transparent nylon film was lifted out of the solution and rinsed with a 10 wt % aqueous solution of ptoluene sulfonic acid, and then rinsed with deionized water.

The surface resistance was measured as $5.4 \times 10^8$ ohm/sq by a 4-in-line probe. The adhesion of the polyaniline coating to the nylon film was excellent. The coating survived rubbing and scratching and did not peeled off by the application of Scotch tape.

EXAMPLE 3

A portion of the polyaniline coated nylon film obtained in Example 2 was soaked in a 100 mL aqueous solution containing 1.62 g o-toluidine and 9.67 g p-toluene sulfonic acid.

Then 0.4 mL of ammonium peroxydisulfate solution, APS, (prepared by dissolving 157 g ammonium peroxydisulfate in 270 mL deionized water) was added dropwisely into the above solution to induce the polymerization of o-toluidine. The polymerization initiated preferentially from the coated polyaniline, evidenced by the appearing of blue color on the film within about a few seconds; while the rest of the solution stayed colorless for about 4 minutes.

After 50 minutes the addition of APS solution, the green transparent nylon film coated with the bis-block copolymer of aniline and o-toluidine was lifted out of the solution and rinsed with a 10 wt % aqueous solution of p-toluene sulfonic acid, and then rinsed with deionized water.

The surface resistance was measured as $2.3 \times 10^5$ ohm/sq by a 4-in-line probe. The adhesion of the bis-block copolymer coating to the nylon film was excellent. The coating survived rubbing and scratching and did not peeled off by the application of Scotch tape.

EXAMPLE 4

A portion of the polyaniline coated nylon film obtained in Example 2 was soaked in a 100 mL aqueous solution containing 2.84 g 2-fluoroaniline and 9.73 g p-toluene sulfonic acid.

Then 0.4 mL of ammonium peroxydisulfate solution, APS, (prepared by dissolving 157 g ammonium peroxydisulfate in 270 mL deionized water) was added dropwisely into the above solution to induce the polymerization of 2-fluoroaniline. The polymerization initiated preferentially from the coated polyaniline, evidenced by the appearing of blue color on the film within about a few seconds and the change of the originally light green color into deeper green with time; while the rest of the solution stayed light brown for more than 24 hours and did not form any polymer particles for more than 48 hours, showing no sign of polymerization activity in the solution.

After 1.5 hours the addition of APS solution, the green transparent nylon film coated with the bis-block copolymer of aniline and 2-fluoroaniline was lifted out of the solution and rinsed with a 10 wt % aqueous solution of p-toluene sulfonic acid, and then rinsed with deionized water.

The surface resistance was measured as $2.3 \times 10^6$ ohm/sq by a 4-in-line probe. The adhesion of the bis-block copolymer coating to the nylon film was excellent. The coating survived rubbing and scratching and did not peeled off by the application of Scotch tape.

EXAMPLE 5

Another piece of nylon film embedded with initiator (N-phenyl-1,4-phenylene diamine) prepared as in Example 1 was air-dried for 2.5 hours, and then soaked in a 100 mL aqueous solution containing 1.62 g o-toluidine and 9.67 g p-toluene sulfonic acid.

Then 1.2 mL of ammonium peroxydisulfate solution, APS, (prepared by dissolving 157 g ammonium peroxydisulfate in 270 mL deionized water) was added dropwisely into the above solution to induce the polymerization of o-toluidine. The polymerization initiated preferentially from the embedded initiator, evidenced by the appearing of blue color on the film within about a few seconds; while the rest of the solution stayed colorless for about 4 minutes.

After 28 minutes the addition of APS solution, the green nylon film coated with poly(o-toluidine) was lifted out of the solution and rinsed with a 10 wt % aqueous solution of p-toluene sulfonic acid, and then rinsed with deionized water.

The surface resistance was measured as $9.5 \times 10^5$ ohm/sq by a 4-in-line probe. The adhesion of the polyaniline coating to the nylon film was excellent. The coating survived rubbing and scratching and did not peeled off by the application of Scotch tape.

EXAMPLE 6

A piece of poly(o-toluidine) coated nylon film obtained in Example 5 was soaked in a 100 mL aqueous solution containing 2.32 g aniline and 9.51 g p-toluene sulfonic acid.

Then 0.4 mL of ammonium peroxydisulfate solution, APS, (prepared by dissolving 157 g ammonium peroxydisulfate in 270 mL deionized water) was added dropwisely into the above solution to induce the polymerization of aniline. The polymerization initiated preferentially from the coated poly(o-toluidine), evidenced by the appearing of blue color on the film within about a few seconds; while the rest of the solution stayed colorless for about 2 minutes.

After 13 minutes the addition of APS solution, the green transparent nylon film coated with the bis-block copolymer of o-toluidine and aniline was lifted out of the solution and rinsed with a 10 wt % aqueous solution of p-toluene sulfonic acid, and then rinsed with deionized water.

The surface resistance was measured as $1.4 \times 10^4$ ohm/sq by a 4-in-line probe. The adhesion of the bis-block copolymer coating to the nylon film was excellent. The coating survived rubbing and scratching and did not peeled off by the application of Scotch tape.

What is claimed is:

1. A process for forming a conjugated backbone block copolymer having at least two blocks of repeating conjugated monomeric units comprising the steps of:
    (a) polymerizing a first conjugated monomer by contacting said first monomer in a solvent with an amount of an oxidizing agent having an oxidation potential greater than the oxidation potential of said conjugated monomer to form a first conjugated backbone polymeric block comprising repeat units derived from said first conjugated monomer; and
    (b) contacting said first conjugated backbone polymeric block in a solvent with a second conjugated monomer in the presence of an effective amount of an effective oxidizing agent having an oxidation potential greater than that of said first conjugated backbone polymeric block to form a conjugated backbone block copolymer comprising said first conjugated backbone polymeric block and a second conjugated backbone polymeric block having at least two recurring monomeric units derived from said second conjugated monomer.

2. A process according to claim 1 wherein step (a), step (b) or step (a) and step (b) are carried out in the presence of an acid dopant having a pKa in said solvent less than the pKa of said conjugated backbone block copolymer to form conjugated backbone block copolymer.

3. A process according to claim 2 wherein the first and second conjugated monomers are selected from the group consisting of substituted or unsubstituted benzenes, naphthalenes, phenanthrenes, anthracenes, carbazoles, anilines, quinolines, pyridenes, thiophenes, pyrroles, furans and azulenes.

4. A process according to claim 1 wherein the said conjugated monomers are substituted or unsubstituted anilines of formula I:

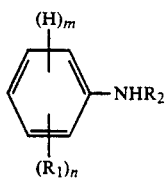  (I)

wherein:
R₁ is the same or different at each occurrence and is a substituted or unsubstituted organic or inorganic radical or amino:
n is an integer from 0 to 4;
m is an integer from 1 to 5 with the proviso that the sum of n and m is 5; and
R₂ is selected from the group consisting of permissible R₁ substituted and hydrogen.

5. A process according to claim 4 wherein:
R₁ is deuterium, alkyl, alkenyl, alkoxy, cycloalkyl, hydroxyl, cycloalkyl, hydroxy, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, nitro, alkylsilane, phosphinic acid, arylsulfonyl, phosphonic acid, sulfonic acid, boric acid, phosphoric acid, sulfonate, borate, phosphonate, phosphinate, phosphate, sulfinic acid, sulfinate, carboxylic acid, halogen, carboxylate, cyano, or alkyl or alkoxy substituted with one or more phosphonic acid, sulfonic acid, boric acid, sulfinic acid, sulfinate, phosphoric acid, sulfonate, borate, carboxylate, phosphonate, phosphate, carboxylic acid, halogen, nitro, hydroxy, cyano or epoxy moieties; or any two R₁ substituents or any one R₁ substituent and any one R₂ substituent taken together may form an alkylene or alkenylene chain or an alkylene or alkenylene chain having one or more divalent ester, carbonyl, nitrogen, sulfur, sulfinyl, sulfonyl or oxygen groups in the chain completing a 3, 4, 5, 6 or 7 membered aromatic, heteroaromatic alicyclic, or heteroalicyclic ring or R₁ is an aliphatic moiety having repeat units of the formula:

(OCH₂CH₂)$_q$O—CH₃, (OCH₂CH(CH₃))$_q$O—CH₃, (CH₂)$_q$CF, (CF₂)$_q$CF₃ or (CH₂)$_q$CH₃ wherein q is a positive whole number.

6. A process according to claim 2, wherein the said conjugated monomers are substituted or unsubstituted anilines of Formula I:

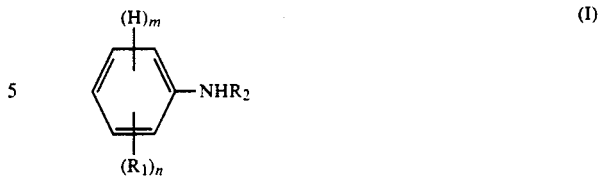

7. The process according to claim 1 wherein steps (a) and (b) are repeated one or more times to form a conjugated backbone block copolymer having one or more additional conjugated backbone blocks.

8. The process according to claim 2 wherein steps (a) and (b) are repeated one or more times to form a doped conjugated backbone block copolymer having one or more additional conjugated backbone blocks.

9. The process of claim 3 wherein steps (a) and (b) are repeated one or more times to form a copolymer having one or more additional polymer blocks.

10. A process according to claim 4 wherein m is from 3 to 5.

11. A process according to claim 10 wherein m is from 4 to 5.

12. A process according to claim 11 wherein R₁ is the same or different at each occurrence and is halogen, alkyl or alkoxy having from 1 to about 30 carbon atoms, cyano, halogen, hydroxy, or alkyl or alkoxy substituted with carboxylic acid, phosphoric acid, phosphinic acid, phosphinate, boric acid, carboxylate, sulfinic acid, sulfonic acid, sulfonate, sulfinate, phosphonate, phosphate, phosphonic acid or borate substituents.

13. A process according to claim 12 wherein R₁ is the same or different at each occurrence and is alkyl or alkoxy having from 1 to about 20 carbon atoms, or substituted alkyl or alkoxy having from 1 to about 20 carbon atoms wherein permissible substituents are alkyl, carboxylic acid, sulfonic acid, phosphoric acid, boric acid, sulfinate, sulfonate, phosphonate, phosphate, carboxylate, phosphonic acid or borate substituents.

14. A process according to claim 12 wherein R₁ is the same or different at each occurrence and is alkyl having from 1 to about 4 carbon atoms.

15. A process according to claim 12 wherein R₁ is alkoxy, fluoro, alkyl, halogen, phenyl, haloalkyl, perhaloalkyl, cyano, or alkoxy, alkyl or phenyl substituted with one or more nitro, alkoxy, sulfonic acid, carboxylic acid, boric acid, phosphoric acid, hydroxy, fluoro, cyano, sulfinic acid, carboxylate, sulfonate, sulfinate, phosphonate, phosphate, phosphoric acid or borate or a moiety of the formula:

—(OCH₂CH₂)$_q$O—CH₃,
(OCH₂CH(CH₃))$_q$O—CH₃, (CH₂)$_q$CF₃,
(CF₂)$_q$CF₃ or (CH₂)$_q$CH₃ wherein q is a positive whole number.

16. A process according to claim 15 wherein:
R₁ is fluoro, or substituted or unsubstituted alkyl, alkoxy or phenyl wherein permissible substituents are one or more fluoro, sulfonic acid, phosphoric acid, sulfinic acid, phosphonate, phosphate, sulfonate, borate, phosphonic acid, boric acid, carboxylic acid, carboxylate, nitro, hydroxy or cyano.

17. A process according to claim 16 wherein:
R₁ is fluoro, alkyl or alkyl or alkoxy substituted within one or more carboxylic acid, sulfonic acid, phosphonate, carboxylate, phosphate, sulfonate, borate, sulfinic acid, sulfinate, phosphonic acid, phosphoric acid, boric acid, fluoro or nitro substituents wherein the aliphatic moiety contains from about 1 to about 30 carbon atoms, phenyl or phenyl substituted with one or more substituents selected from the group consisting of fluoro, alkyl or alkyl substituted with one or more fluoro, nitro, cyano, carboxylic, sulfonic, borate, carboxylate, sulfinic acid, sulfinate, sulfonate, phosphate, phosphoric acid or boric acid moieties.

18. The process of claim 17 wherein $R_1$ is alkyl or substituted alkyl.

19. A process according to claim 6 wherein said acid dopant is selected from the group consisting of $CF_3SO_3H$, $CF_3C_6H_4SO_3H$, $p\text{-}CH_3C_6H_4SO_3H$, $CF_3(CF_2)_3SO_3H$, and $CH_3SO_3HCH_{12}H_{25}C_6H_4SO_3H$, $HOC_6H_4SO_3H$, $C_{10}H_7SO_3H$, $C_{10}H_6(SO_3H)_2$, $(C_8H_{17})C_{10}H_6(SO_3H)$ $(C_8H_{17})C_{10}H_5(SO_3H)$ $(C_8H_{17})C_{10}H_5(SO_3H)_2$ $(C_8H_{17})_2C_{10}H_4(SO_3H)_2$.

20. A process according to claim 2 wherein said acid dopant is a compound of the formula:

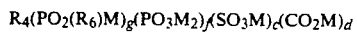

or

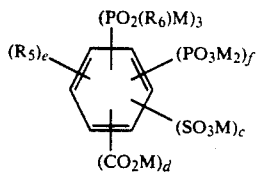

wherein:

c, d, e, f and g are the same or different and are 0, 1 and 2, with the proviso that at least one of c, d, f and g is not 0;

$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphonic acid, phosphinate salt, phosphonate salt, amino or carboxylic acid, groups, or phenyl substituted with one or more alkyl, alkoxy, fluoroalkyl, sulfonic acid, phosphinic acid, phosphonic acid phosphinate salt, phosphonate salt, sulfonate salt, carboxylate, hydroxy, nitro, cyano, or carboxylic acid groups or any two $R_6$, or any two $R_5$ substituents together may form an alkylene or alkenylene chain completing a naphthalene, anthracene or phenanthrene fused system which may be substituted with one more alkyl, alkoxy, fluoro, phosphinic acid, phosphinate salt, phosphonic acid, phosphonate salt, fluoroalkyl, sulfonic acid, sulfonate salt, carboxylic acid, carboxylate salt, hydroxy, nitro, amino or cyano groups;

$R_6$ is aryl, aryloxy, alkyl or alkoxy; and

M is $H^+$ or other metal or non-metal cation, with the proviso that at least one of M is $H^+$ or is a moiety which can be thermally transformed into a proton under process conditions.

21. A process according to claim 20 wherein said acid dopant is a compound of the formula:

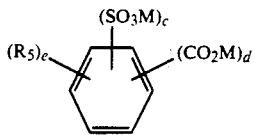

wherein:

M is $H^+$.

c is 1, 2 or 3;

d and e are the same or different and are 0, 1 or 2; and $R_5$ is hydroxy, cyano, halo or substituted or unsubstituted alkyl having from 1 to about 30 carbon atoms, phenyl or phenylalkyl having from 7 to about 30 carbon atoms wherein permissible substituents are halo, alkyl, alkoxy, cyano, boric acid, phosphoric acid, phosphate, borate, phosphonate, sulfonate, phosphonic acid, sulfonic acid, carboxylate and carboxylic acid groups or any two $R_5$ groups may form a divalent substituted or unsubstituted alkenylene chain completing a naphthalene, anthracene or phenanthrene fused ring structure, which chain may be substituted with one or more hydroxy, cyano, halo, sulfonic acid, boric acid, phosphoric acid, alkyl, alkoxy, sulfinate, phosphate, borate, carboxylate, phosphonic acid, phosphonate, sulfonate, sulfinic acid, carboxylic acid or alkyl or alkoxy substituted with one or more carboxylic acid, sulfonic acid or fluoro groups.

22. A process according to claim 21 wherein:

M is $H^+$;

c is 1, 2 or 3;

d and e are the same or different and are 0, 1 or 2; and $R_5$ is alkyl having from 1 to about 15 carbon atoms, fluoro, alkyl substituted with one or more fluoro, nitro, cyano, boric acid, phosphoric acid, phosphate, carboxylate, borate, phosphonate, sulfinic acid, sulfinate, phosphonic acid, sulfonate, sulfonic acid or carboxylic acid group; or any two $R_5$ groups together may form a substituted or unsubstituted divalent alkenylene chain completing a naphthalene, anthracene or phenanthrene structure where permissible substituents are one or more sulfonic acid, boric acid, phosphoric acid, phosphate, borate, sulfinic acid, sulfinate, phosphonate, carboxylate, sulfonate, phosphonic acid, fluoro, carboxylic acid, or alkyl substituted with one or more fluoro, sulfonic acid, carboxylate, phosphonic acid, phosphonate, sulfonate, boric acid, borate, phosphoric acid, phosphate, or carboxylic acid groups.

23. A process according to claim 22 wherein:

M is $H^+$;

c is 1, 2 or 3;

d is 0;

e is 0, 1 or 2; and $R_5$ is alkyl, fluoro or alkyl substituted with one or more fluoro substituents or any two $R_5$ group together may form a substituted or unsubstituted divalent alkenylene chain completing a naphthalene, anthracene or phenanthrene ring structure, wherein permissible substituents are one or more sulfonic acid, sulfonate, fluoro or alkyl substituted with one or more sulfonic acid, sulfonate or fluoro groups.

24. A process according to claim 4 wherein said copolymer has repeat units of the formulas:

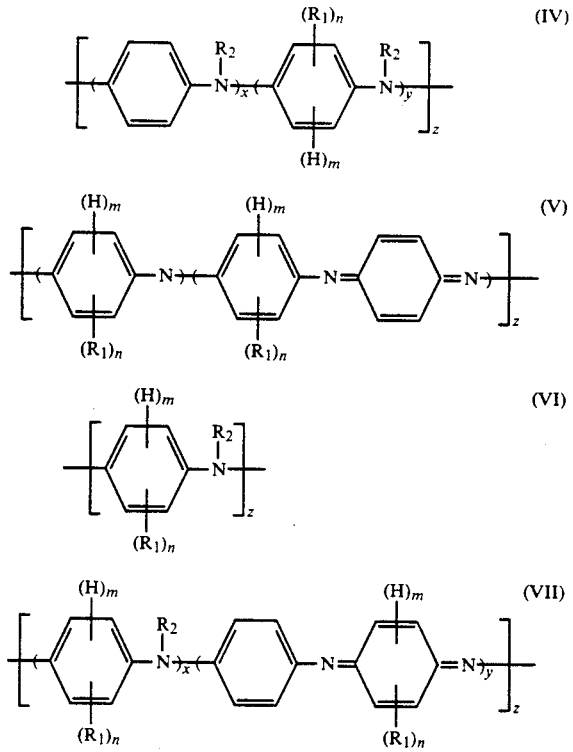

wherein:
x is an integer equal to or greater than 0;
y is equal to or greater than 0, with the proviso that the ratio of x to y is greater than about 0;
z is the same or different and is equal to or greater than about 1;
n is an integer from 0 to 4;
m is an integer from 1 to 5 with the proviso that the sum of n and m is 5;
$R_1$ is the same or different at each occurrence and is alkyl, alkenyl, alkoxy, cycloalkyl, cycloalkenyl, alkanoyl, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid, phosphonic acid, alkylsilyl, boric acid, arylsulfonyl, carboxylic acid, halogen, hydroxy, phosphate, sulfonate, phosphonate, borate, phosphinate, carboxylate, nitro, cyano, sulfonic acid, phosphoric acid, or alkyl or alkoxy substituted with one or more sulfonic acid, carboxylic acid, sulfinate, phosphoric acid, boric acid, sulfinic acid, halogen, nitro, cyano, epoxy, hydroxy, sulfonate, phosphate, phosphonate, phosphinic acid, phosphinate, carboxylate, phosphonic acid or borate moieties; or any two $R_1$ substituents or any one $R_1$ group and any $R_2$ group together may form an alkylene or alkenylene chain or an alkylene or alkenylene chain which includes one or more divalent nitrogen, ester, carbonyl, sulfur, sulfinyl, sulfonyl or oxygen groups in the chain, completing a 3, 4, 5, 6, 7, 8, 9 or 10 membered aromatic, alicyclic, heteroaromatic or heteroalicyclic ring.

25. A process according to claim 24 wherein z is equal to or greater than about 10.

26. A process according to claim 25 wherein said polyaniline is of the Formulas III or V.

27. A process according to claim 26 wherein x is equal to or greater than about 1, and y is equal to or greater than about 0, with the proviso that the ratio of x to y is at least about 1.

28. A process according to claim 27 wherein x is equal to or greater than about 2 and y is equal to or greater than about 0, with the proviso that the ratio of x to y is at least about 2.

29. A process according to claim 28 wherein x is 2 and y is 1.

30. A process according to claim 1 wherein said process is carried out in the presence of a dopant.

31. A process according to claim 1 wherein said process is carried out in the absence of a dopant.

32. A process according to claim 31 which further comprises the step of doping said block copolymer to form an electrically conductive copolymer.

33. The process of claim 1 wherein step (a) is carried out in the presence of a reactive substance to provide a conjugated backbone block copolymer on a surface of said substrate.

* * * * *